(12) United States Patent
Spijker et al.

(10) Patent No.: US 8,561,784 B2
(45) Date of Patent: Oct. 22, 2013

(54) APPARATUS AND METHOD FOR CONVEYING ORGAN PACKAGES TO A PROCESSING STATION

(75) Inventors: Remco Spijker, Oostzaan (NL); Tom Cornelis Jansen, Oostzaan (NL); Aloysius Christianus Maria Van Steijn, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 100 days.

(21) Appl. No.: 12/719,569

(22) Filed: Mar. 8, 2010

(65) Prior Publication Data

US 2011/0061996 A1    Mar. 17, 2011

(30) Foreign Application Priority Data

May 5, 2009   (NL) .................................... 2002840

(51) Int. Cl.
   *B65G 47/74*   (2006.01)
   *B65G 47/34*   (2006.01)
(52) U.S. Cl.
   USPC ............... 198/482.1; 198/370.1; 198/370.04
(58) Field of Classification Search
   USPC .................... 198/482.1, 483.1, 463.1
   See application file for complete search history.

(56) References Cited

U.S. PATENT DOCUMENTS

| 2,516,499 | A |   | 7/1950  | Albright |
| 2,738,547 | A |   | 3/1956  | Zebarth |
| 3,908,817 | A | * | 9/1975  | Neville et al. ............. 198/623 |
| 6,382,401 | B2 | * | 5/2002 | Takemoto et al. ....... 198/803.11 |
| 6,874,614 | B2 | * | 4/2005 | Heitplatz ................. 198/370.04 |
| 6,962,250 | B2 | * | 11/2005 | Van Liempd et al. .... 198/457.06 |
| 7,017,730 | B2 | * | 3/2006 | Mills et al. .................. 198/368 |
| 2006/0183413 | A1 |   | 8/2006 | Florindo et al. |

FOREIGN PATENT DOCUMENTS

DE    12 02 722 B    10/1965
WO    WO 2008/094033 A1    8/2008

OTHER PUBLICATIONS

Search report for 2002840, dated Nov. 25, 2009.

* cited by examiner

*Primary Examiner* — Kavel Singh
(74) *Attorney, Agent, or Firm* — Dority & Manning, P.A.

(57) ABSTRACT

An apparatus and method for conveying organ packages to a processing station or stations is provided. The apparatus can include a tray-conveyor having a series of trays movable in the conveying direction. Each such tray is arranged to receive an organ package. The tray-conveyor has at least one discharge-station for the organ packages that are to be moved to the processing station or stations.

10 Claims, 1 Drawing Sheet

APPARATUS AND METHOD FOR CONVEYING ORGAN PACKAGES TO A PROCESSING STATION

FIELD OF THE INVENTION

The invention relates to an apparatus and method for conveying organ packages to a processing station or stations. The apparatus can include a tray-conveyor having a series of trays movable in the conveying direction, each tray arranged to receive an organ package, wherein the tray-conveyor has at least one discharge-station for the organ packages that are to be moved to the processing station or stations.

BACKGROUND OF THE INVENTION

An apparatus is known from the European patent specification EP-B-0 564 025 in the name of the applicant. In the known apparatus, organ packages, in particular entrails packages, are conveyed in a tray conveyor to a processing station where the entrails packages are separated into separate parts such as the intestines, the liver, and heart with lungs. Such apparatus, according to the preamble, can be used for conveying organ-packages in the trays from an inspection station, where the organ packages are inspected for conformity with health regulations, to a processing station at which the organs of the organ-packages are harvested. The harvesting is carried out by harvesting machines that are usually placed in parallel to each other and perpendicular to the conveying direction of the apparatus in which the organ packages are conveyed.

In the transfer of the organ packages at the discharge station for moving the packages to the processing station or stations, it is desired that the orientation of the organ packages is maintained such that the organs which are to be harvested are lying at the top part of the organ packages. This promotes optimal performance of the harvesting machine. It is therefore an object of the apparatus and method of the invention for conveying organ packages to a processing station or stations, that the orientation of the organ packages is maintained during the transfer of the packages from the tray or trays to the processing station or stations.

SUMMARY OF THE INVENTION

Objects and advantages of the invention will be set forth in part in the following description, or may be obvious from the description, or may be learned through practice of the invention. The apparatus and method of the invention are characterized by one or more of the appended claims.

In a first exemplary embodiment of the invention, the apparatus for conveying organ packages to a processing station or stations is embodied with the feature that each discharge-station is provided with a sweeper-device for wiping an organ package out of the tray that passes the discharge-station.

The operation of the apparatus of the invention can thus be arranged such that, at the at least one discharge station, the organ package or packages are moved out of their tray or trays in a direction essentially transverse or perpendicular to the conveying direction. In this movement the orientation of the organ packages can easily be maintained and the optimal operation of the subsequent processing station or stations is thus effectively facilitated.

The method of the invention can be effectively carried out by embodying the apparatus such that the sweeper-device includes a pusher-plate that, in use, moves at least in part transversely to the conveying direction and over or above the tray's supporting surface for the organ package supported by that tray. This secures the maintenance of the orientation of the organ packages and combines this objective with a reliable way of moving the organ packages in the discharge stations to the respective processing stations.

An appropriate manner of embodying the sweeper-device of the invention is by arranging it with a pusher-plate conveyor that is placed above the tray-conveyor and is arranged to cause that, in use, the pusher-plate moves along with the tray in its conveying direction in a predefined part of the conveying path of the tray. The predefined part of the conveying path of the tray lies approximately in the area occupied by the discharge station.

In order to secure that the apparatus of the invention is suitable for automated and continued use allowing that the apparatus can be applied to discharge a train of organ packages arriving at the discharge station, it is preferred that the pusher-plate conveyor is arranged to have the pusher-plate follow an endless path that is closed in itself, causing that the pusher-plate, while moving along with the tray in the predefined part of the tray's conveying path, initially comes down to the tray, makes a wiping movement over or above the tray transversely to the tray's conveying direction, and eventually moves away from the tray upwardly to return to a position from which it can come down to a next tray.

In order to promote an effective operation on such a train of continuously supplied organ packages, it is further desirable that the sweeper-device of each discharge-station is synchronously driven with the tray-conveyor.

Still a further preferred exemplary embodiment of the apparatus of the invention is that the tray-conveyor is provided with a driving gear wheel having circumferential teeth that cooperate with rollers mounted circumferentially on a driven gear wheel that drives at least one sweeper-device. This provides an uncomplicated mechanical means for securing synchronism between the tray conveyor and the concerning discharge station that is reliable and cost effective. Alternatively the synchronized driving of the tray conveyor and the sweeper devices of the discharge stations can be secured by an electrical coupling between the two drive trains. This can be embodied in a manner that is well known for the man skilled in the art. A further disclosure of such an electrical coupling is therefore not necessary.

In order to arrange that the sweeper-device can effect a transverse movement of the pusher-plate with respect to the conveying direction of the series of trays, it is preferable that the driving gear wheel of the tray-conveyor and the driven gear wheel of at the least one sweeper-device have shafts that are obliquely oriented with respect to each other.

A further preferred feature is that the sweeper-device of each discharge-station is movable up-and-down. In this manner, it is easy to individually put a sweeper-device into operation by moving it down to the tray-conveyor or to put such a sweeper-device individually out of operation by moving it up and away from the tray-conveyor. This facilitates by-passing of the sweeper-device in case of rejected organ packages, for instance, stemming from rejected birds.

Another exemplary aspect of the invention which is applicable independent from any of the afore-mentioned features is that the trays are substantially identical and each tray has in the conveying direction of the tray-conveyor a leading upper edge and a trailing upper edge whereby the leading upper edge and the trailing upper edge of subsequent trays have different heights and are in an overlay arrangement so as to allow that the trailing edge of a first tray can move unhindered by the leading edge of a second tray that is adjacent to and following the first tray in the conveying direction. In this manner the tray conveyor can easily be designed with left and right bends or with altitude variations without being limited by the particular design of the trays. A further advantageous aspect of this arrangement is that it effectively prevents the clogging of dirt from the organ packages to remain stuck between neighboring trays.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures. The invention will hereinafter be further elucidated with reference to a drawing of an exemplary embodiment of an apparatus for conveying organ packages in accordance with the invention.

Wherever in the figures the same reference numerals are applied these numerals refer to the same parts.

DETAILED DESCRIPTION

Figure 1:
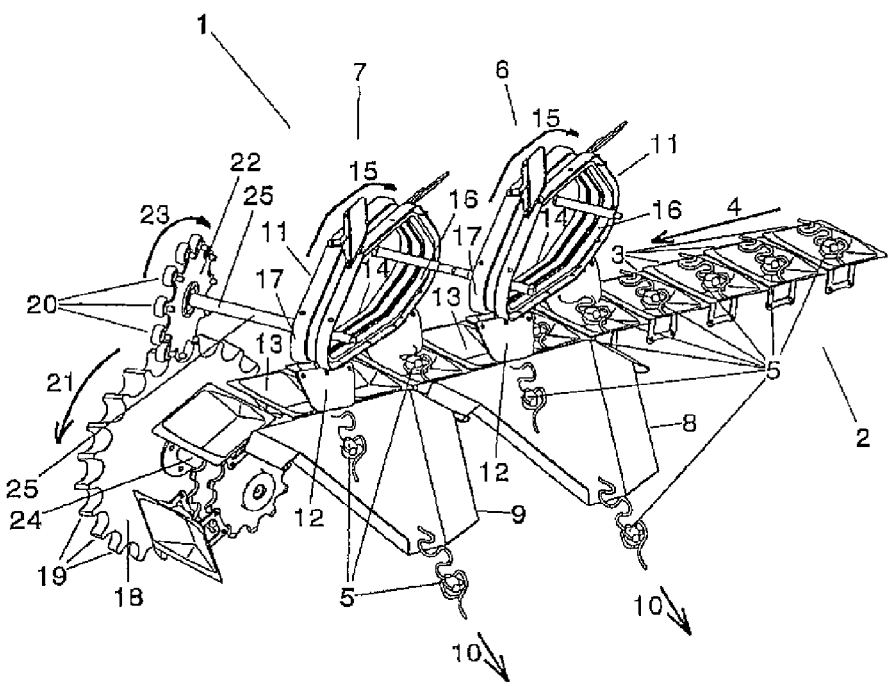
FIG. 1 shows a perspective view of the most important parts of an exemplary embodiment of the invention.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents. It is remarked that the figures are very schematic representations of respective parts of the apparatus of the invention showing only those parts that are essential for the understanding of the operation and construction of this apparatus, and leaving away those parts that are not deemed essential therefore.

With reference first to FIG. 1, the apparatus for conveying organ packages to a processing station or stations is generally denoted with reference numeral 1.

This apparatus 1 for conveying organ packages 5 to a processing station or stations includes a tray-conveyor 2 having a series of trays 3 that are movable in the conveying direction 4. Each tray 3 is arranged to receive one organ package 5.

Further the tray conveyor 2 has, in the embodiment shown, a first discharge station 6 and a second discharge station 7. Each discharge station 6, 7 is embodied with a chute 8, 9 for discharging organ packages 5 in the direction of (not shown) processing stations. The discharge of the organ packages 5 to the (not shown) processing stations is symbolized by the arrows 10.

In accordance with the invention, each discharge station 6, 7 is provided with a sweeper-device 11 for wiping an organ package 5 out of the tray 3 that passes the concerning discharge station 6, 7.

For this purpose, each sweeper-device 11 includes a pusher plate 12 that, in use, moves at least in part transversally to the conveying direction 4 and over or above a supporting surface 13 of the concerning tray 3 for the organ package 5.

The pusher-plate 12 is supported by a pusher-plate conveyor 14 that is arranged above the tray-conveyor 2 and that is further arranged to cause that, in use, the pusher-plate 12 moves partly along with the tray 3 from which it will remove the organ package 5. The movement of the pusher-plate 12 along with the tray 3 occurs in the conveying direction 4 of the tray 3 over a limited but predefined part of the conveying path of the tray 3.

To this end the pusher-plate conveyor 14 is clearly shown in FIG. 1 to be arranged such that the pusher-plate 12 follows an endless path (part of which is symbolized by the arrow 15) that is closed in itself therewith effecting that the pusher-plate 12, while moving along with the tray 3 in the earlier mentioned predefined part of the tray's conveying path, initially comes down to the tray 3 approximately in the area indicated with reference numeral 16, then makes a wiping movement over or above the tray. The wiping movement is transverse to the conveying direction 4 of the tray 3, which movement approximately ends when the pusher-plate 12 is near to the centre of the chute 8, 9. Thereafter, the pusher-plate 12 moves away from the tray 3 in a sharp upward bend at numeral 17 to return eventually to a position from which it can come down again to a next tray 3.

Appropriately, the sweeper-device 11 of each discharge station 6, 7 is synchronously driven with the tray conveyor 2. For this purpose, the tray-conveyor 2 is provided with a driving gear wheel 18 having circumferential teeth 19 that cooperate with rollers 20 that are mounted circumferentially on a driven gear wheel 21 that in turn drives at least one sweeper-device 7. Rotation of the driven gear wheel 18 in accordance with the conveying direction 4 of the tray-conveyor 2 takes place in the direction of arrow 21 and, consistent with its construction the rollers 20 that are mounted on the driven gear wheel 21, correspondingly effect rotation of the gear wheel 22 in the direction of arrow 23. Schematically it is shown that the gear wheel 22 is linked to the sweeper-device 7 to cause movement of the pusher-plate conveyor 14 in the direction of arrow 15. Due to this movement of the pusher-plate conveyor 14, the pusher-plate 12 follows an endless path that is closed in itself due to which the organ package 5 that arrives at the discharge station 7 supported by its tray 3 is moved out of the tray 3 in a direction essentially transverse or perpendicular to the conveying direction 4 of the tray-conveyor 2.

FIG. 1 further shows that the driving gear wheel 18 of the tray-conveyor 2 and the driven gear wheel 22 of the sweeper device 7 have shafts 24 and 25 respectively, that are obliquely oriented with respect to each other. This makes an oblique placement of the pusher-plate conveyor 14 with respect to the tray conveyor 2 possible, wherein the continuous movement of the pusher-plate conveyor 14 causes the pusher-plate 12 to initially come down to the tray 3, makes then a wiping movement over or above the tray 3 transversely to the tray's conveying direction 4, and eventually moves away from the tray 3 in an upward motion to return to a position from which it can come down again to a next tray 3.

The shown sweeper-devices 11 of the discharge stations 6, 7 are preferably arranged to be movable up and down in order to allow that they can selectively be placed into operation or out of operation depending on whether the organ packages are from accepted or rejected birds.

Figure 2:
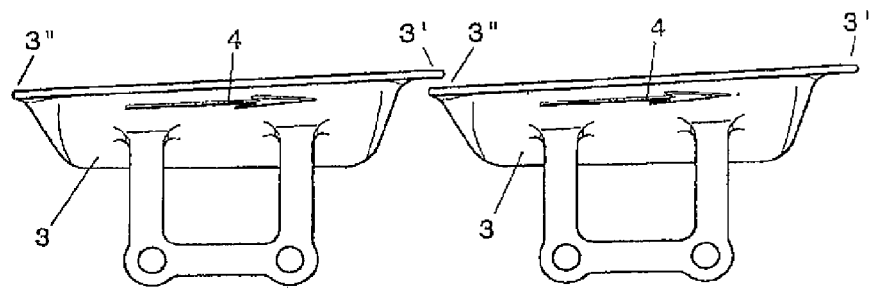
FIG. 2 shows two consecutive trays of a tray-conveyor forming part of an exemplary embodiment of the invention in a side-view.
Figure 3:
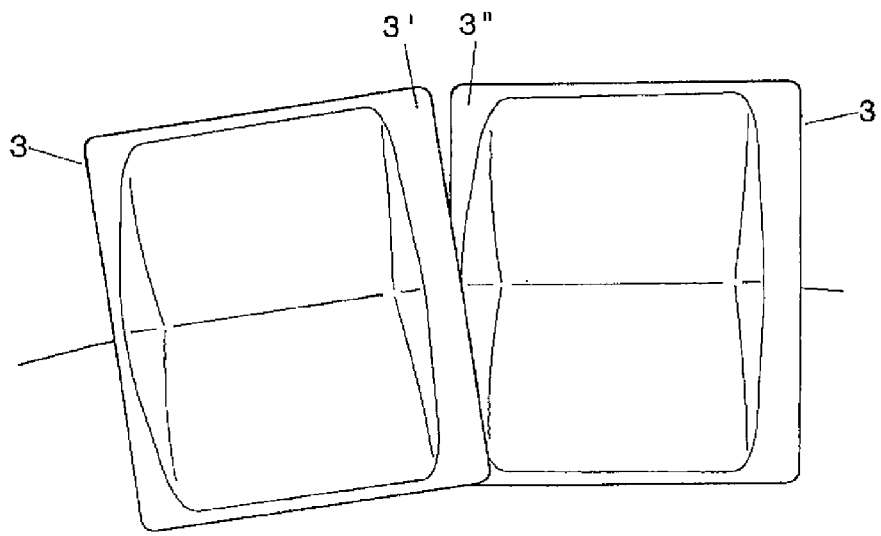
FIG. 3 shows a top view of two consecutive trays of a tray conveyor forming part of an exemplary embodiment of the invention.

With reference to both FIG. 2 and FIG. 3, a further aspect of the invention is shown concerning that the trays 3 are substantially identical and are arranged such that each tray 3 has in the conveying direction 4 of the tray-conveyor a leading upper edge 3' and a trailing upper edge 3". Hereby the leading upper edge 3' and the trailing upper edge 3" of subsequent trays 3 are embodied with different heights and are placed in an overlay arrangement as is shown in FIG. 2 and FIG. 3 so as to allow that the trailing edge 3" of a first tray can move unhindered by the leading edge 3' of a second tray that is adjacent to and follows the first tray in the conveying direction 4.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

The invention claimed is:

1. An apparatus for conveying organ packages to one or more processing stations, the apparatus comprising:
   a tray conveyor having a series of trays movable in a conveying direction along a length of the tray conveyor, wherein each of the trays is arranged to receive an organ package; and
   at least one discharge station for the organ packages, said discharge station positioned above the trays of said tray conveyor and having a sweeper device configured for wiping the organ packages out of the trays as the trays pass below said discharge station; said sweeper device comprising a pusher plate carried on a pusher plate conveyor that is structured to simultaneously move the pusher plate along both the conveying direction and along a direction transverse to the conveying direction over at least a portion of said tray conveyor;
   wherein said trays are substantially identical, and wherein along the conveying direction each said tray has a leading upper edge and a trailing upper edge, and wherein the trailing upper edge of a first tray and the leading upper edge of an adjacent, second tray have different heights and are in overlay arrangement so as to allow the trailing edge of the first tray can moved unhindered by the leading edge of the second tray that is adjacent to and following the first tray along the conveying direction.

2. An apparatus for conveying organ packages as in claim 1, wherein the pusher plate moves transversely to the conveying direction and above a supporting surface for the organ package that is located on each of the trays.

3. An apparatus for conveying organ packages as in claim 1, wherein the sweeper device further comprises a plurality of pusher plates carried in synchronization with said tray conveyor, said pusher plates configured for movement in a direction substantially transverse to the conveying direction and above a support surface for the organ package that is located on each of the trays.

4. An apparatus for conveying organ packages as in claim 3, wherein said pusher plate conveyor is arranged to follow along an endless path such that during a predetermined part of a path of said tray conveyor, each of said pusher plates comes down sequentially to one of said trays to make a wiping movement over the tray along a direction transverse to the conveying direction, and then moves away and upwardly to return to a position to wipe another of said trays.

5. An apparatus for conveying organ packages as in claim 1, wherein said discharge station is drive in synchronization with said tray conveyor.

6. An apparatus for conveying organ packages as in claim 1, further comprising:
   a driving gear wheel in mechanical communication with said tray conveyor, said driving gear wheel having circumferential teeth;
   a driven gear wheel that drives said sweeper device; and
   a plurality of rollers located about the circumference of said driven gear wheel that cooperate with the circumferential teeth of said driving gear wheel.

7. An apparatus for conveying organ packages as in claim 1, wherein said driving gear wheel and said driven gear wheel each have shafts that are oriented obliquely with respect to each other.

8. An apparatus for conveying organ packages as in claim 1, wherein said sweeper device is movable up and down with respect to said tray conveyor.

9. A method for conveying organ packages to one or more processing stations, the method comprising the steps of:
   moving a plurality of trays along a conveying direction and past at least one discharge station, wherein each tray holds at least one organ package; and
   transporting a plurality of pusher plates above the plurality of trays and along the conveying direction while simultaneously sweeping the pusher plates over a supporting surface of each tray in a direction transverse to the conveying direction so as to advance the at least one organ package to at least one processing station;
   wherein said trays are substantially identical and wherein along the conveying direction each said tray has a leading upper edge and a trailing upper edge, and wherein the trailing upper edge of a first tray and the leading upper edge of an adjacent, second tray have different heights and are in overlay arrangement so as to allow the trailing edge of the first tray can moved unhindered by the leading edge of the second tray that is adjacent to and following the first tray along the conveying direction.

10. A method for conveying organ packages to one or more processing stations as in claim 9, further comprising the step of synchronizing the movement of said trays and said pusher plates.

\* \* \* \* \*